Oct. 5, 1948.        J. A. E. CARLSON        2,450,849
                         LAWN MOWER

Filed July 20, 1944                           2 Sheets-Sheet 1

INVENTOR.
J. A. EDWIN CARLSON
BY
    ATTORNEY

Patented Oct. 5, 1948

2,450,849

UNITED STATES PATENT OFFICE 2,450,849

LAWN MOWER

J. A. Edwin Carlson, Racine, Wis., assignor to Jacobsen Manufacturing Company, Racine, Wis.

Application July 20, 1944, Serial No. 545,761

3 Claims. (Cl. 56—249)

The present invention relates to what is commonly called a push type lawn mower and generally stated has for its objects providing a mower which is strong, simple, light, durable and easily manufactured at low cost.

An object of the present invention is to provide a lawn mower having convenient means for adjustments and capable of operating under all conditions at minimum power.

An important object of the present invention is to provide a mower which can be largely made from sheet steel and wherein the completed assembly is very rigid and easily understood as to adjustments and easily kept lubricated.

To these and other useful ends my invention consists of parts, combinations of parts or their equivalents as hereinafter described and claimed and shown in the accompanying drawings, in which:

Figure 1:
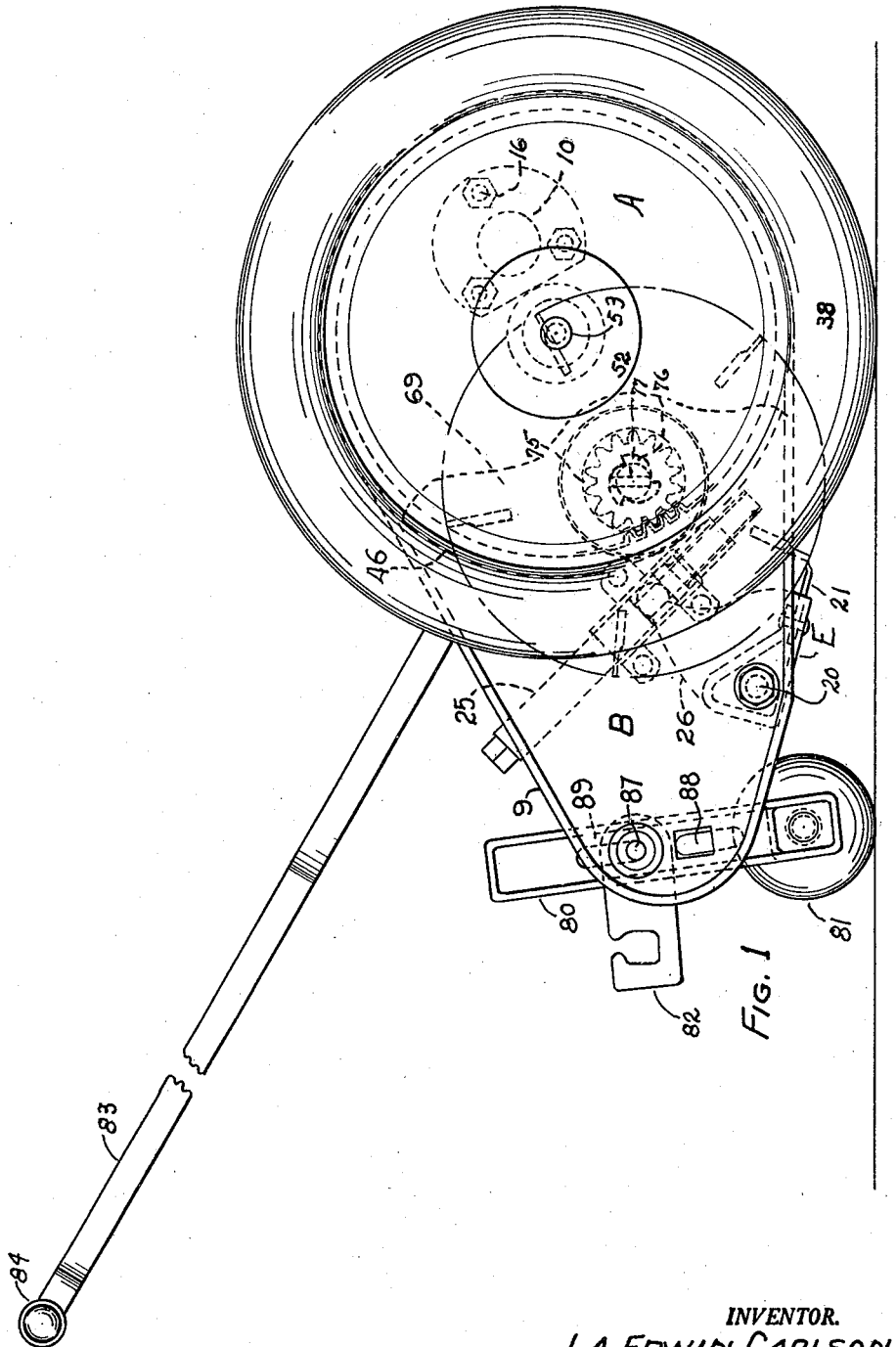
Fig. 1 is a side elevational view of my improved mower.

As thus illustrated the carrying wheels which are preferably rubber tired as shown, are designated in their entireties by reference character A. The end frame members are designated in their entireties by reference characters B and C and reference character D designates in its entirety the cutter rotor. Members B and C have outwardly extending continuous flanges 9—9 as shown and are secured together by at least one cross brace 10, which is, as will be noted, made from tubing and having secured to its ends flanged sleeves 11—11. Members B and C have openings as at 12 for the reception of the ends of member 10 which protrude slightly through members 11. The flanges of members 11 have three or more apertures 13 formed with flanges 14 which extend into corresponding openings 15 in members B and C.

I provide bolts 16 with which to firmly hold the flanges against members B and C. Flanges 14 are somewhat shorter than the thickness of members B and C for this purpose. Thus it will be seen that members B and C will be held firmly in spaced relation by member 10. The rear ends of members B and C are held in spaced relation by means of a cutter bar designated in its entirety by reference character E. The fastenings of the cutter bar assembly E to members B and C are made by means of bolts 20—20, these bolts acting as an axis upon which member E turns when being adjusted, by means of a screw-threaded member 25 in bracket 24 which is operatively connected to an upwardly extending portion 26 of member E.

Members A comprise discs 30—30 which are flanged as at 31—31, each having a bracing disc 32—32 with flanges 33—33. Members A are supplied with hub members 34 on which flanges 31 and 33 are tightly pressed, their end flanges 35 and 35' lying against the ends of members 34—34, thus forming a substantial light weight and strong wheel upon which tires 38—38 are mounted. The tires 38—38 rest on flanges 39—39 on the periphery of members 30, and on flanges 40—40 on the periphery of members 32. Members 40 are provided with inwardly extending flanges 45—45 within which internally toothed gears 47—47 are mounted.

I provide spindles 50—50 which are suitably and firmly secured to members B and C as illustrated. Members 50 are slightly smaller in outside diameter than the inside diameter of sleeves 34 and are provided with composition metal bushings 51. Wheels A are held on spindles 50 by means of caps 52—52, which are held to members 50 by means of screws 53. Caps 52 are provided with inturned flanges 54 thus to protect the ends of the bearings.

The rotor D of my mower comprises a shaft 60, and two or more tubes, each having a number of arms 61, the arms having suitable seats 62 and are suitably positioned for the supporting of cutter blades 63 of which there may be three or more.

Shaft 60 is journaled in members B and C by means of ball bearings 70—70, the bearings being mounted in flanges 71—71 which are preferably formed in members B and C. I provide cupped shaped annular members 72—72, and annular L-shaped members 69—69 which are secured to members B and C preferably by rivets 73 as illustrated in Figure 2. I provide other pressed assemblies F as shown, suitable for practically sealing the ball bearings against ingress of dirt, etc., and capable of retaining oil for a reasonable time. Members 69 are elongated vertically and are secured to members B and C and having flanges 46 which surround the remainder of gear member 45 (see dotted lines in Figure 1).

Figure 2:
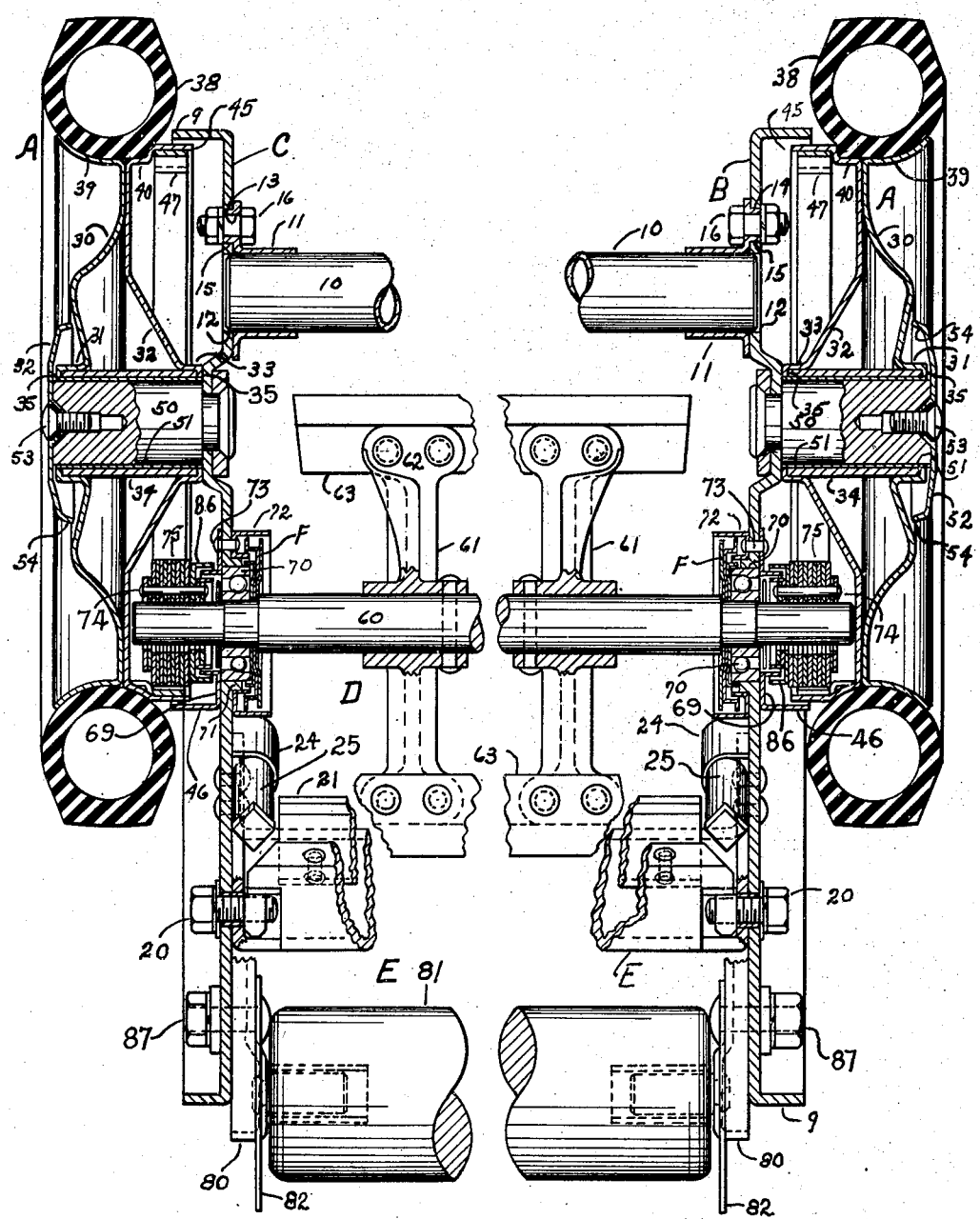
Fig. 2 is a top fractional partially sectioned view of my improved mower.

On the outer ends of member 60, I mount pinions 75—75 which are formed from punched sheet metal in the shape shown in Fig. 1 and being riveted together as at 74 and having on their inner surfaces substantial sealing means 86 as shown in Fig. 2. Members 75 are rotatably mounted on the ends of shaft 60 but being cut away in their openings as at 76 so as to form recesses, which cooperate with a slidably mounted pin 77 in the shaft to form driving ratchets (see dotted lines in Fig. 1). Thus one wheel can over travel without locking the device or sliding one of the tires on the sod.

On the rear end of members B and C, I slidably mount brackets 80—80 by extending their holding bolts 87—87 and guiding lugs 88—88 into or through slots 89—89, on the bottom of which is rotatably mounted preferably a carrying roller 81. I also provide brackets 82—82 on which a grass catching device may be attached. Member E has a fixed cutter blade 21 and clearly by moving brackets 80 up or down on members B and C, member 21 will be raised or lowered, thus to change the length of the stubble.

I provide the conventional handle bars 83 which diverge at their forward ends and are hingedly mounted (not shown) to members B and C, the rear ends of bars 83 having spaced apart handles 84. Thus it will be seen that I have provided a very simple, strong, and rigid lawn mover which is light and efficient and easily manufactured at low cost.

Having thus shown and described my invention, I claim:

1. In a push type lawn mower, the combination of spaced end frame members having a pair of carrying wheels, rotatably mounted on the forward end thereof, a carrying member rotatably mounted on the rear ends of the frame, a pair of rearwardly extending guiding handles secured to said end frame members, a brace between the forward ends of said end members and a blade assembly secured to the rear ends thereof a distance forward therefrom and being turnably adjustably secured to the frame members, said carrying wheels having internal gears mounted on their inner sides, a blade carrying rotor rotatably mounted on said end frame members, its shaft ends protruding therethrough and having mounted thereon pinions adapted to engage the teeth of said gears, said end frame members being formed from flat stock and having outwardly extending continuous flanges on their edges which partially surround said gears, other flanges secured to said end members adapted to surround the remainder of the gears.

2. A device as recited in claim 1 including; said brace comprising a tube, flanged sleeves secured to the tube ends with the ends of the tubes protruding slightly, openings in the frames into which the protruding tube ends extend, a number of spaced flanges on said sleeve flanges having openings, openings in said frame members adapted to snugly receive said last flanges and bolts extending through said last openings and adapted to bind said sleeve flanges to the end frame members.

3. A device as recited in claim 1, the rotatable mountings of said rotor shaft comprising ball bearings mounted in flange openings in the end members, outwardly extending flanged members secured to the outer side of said frame members having openings concentric with the ball bearings and adapted to act as a stop for the outward thrust of the ball bearings, annular members having inwardly extending flanges secured to the inner side of said end members and concentric with said ball bearings, other members secured to said rotor shaft and adapted to take the inward thrust of said ball bearings and having outwardly extending flanges which extend freely past the flanged ball bearing opening and having other flanges in close proximity to said inwardly extending annular flanges, whereby the ball bearings are protected from ingress of grass and foreign matter and said rotor shaft is positioned longitudinally by said ball bearings.

J. A. EDWIN CARLSON.

REFERENCES CITED

The following references are of record in the file of this patent:

UNITED STATES PATENTS

| Number | Name | Date |
|---|---|---|
| Re. 22,031 | Clemson | Feb. 24, 1942 |
| 1,754,188 | Coldwell | Apr. 8, 1930 |
| 1,826,663 | Hessenbruch | Oct. 6, 1931 |
| 2,076,344 | Leake | Apr. 6, 1937 |
| 2,269,920 | Seaver | Jan. 13, 1942 |
| 2,303,055 | Lardi | Nov. 24, 1942 |
| 2,340,849 | Wildeboor et al. | Feb. 8, 1944 |

FOREIGN PATENTS

| Number | Country | Date |
|---|---|---|
| 4,895 | Australia | Nov. 29, 1932 |